United States Patent [19]

Amacker

[11] Patent Number: 5,341,896
[45] Date of Patent: Aug. 30, 1994

[54] SAFETY HARNESS FOR TREE CLIMBERS

[76] Inventor: Joseph A. Amacker, 1212 Main St., Delhi, La. 71232

[21] Appl. No.: 1,754

[22] Filed: Jan. 6, 1993

Related U.S. Application Data

[63] Continuation-in-part of Ser. No. 818,118, Jan. 8, 1992, abandoned.

[51] Int. Cl.⁵ ............................................. A62B 35/00
[52] U.S. Cl. ........................................ 182/9; 182/133
[58] Field of Search ................................. 182/3–9, 182/133, 189, 190, 191, 136

[56] References Cited

U.S. PATENT DOCUMENTS

| | | | |
|---|---|---|---|
| 1,851,080 | 3/1932 | Becker | 182/6 |
| 2,152,049 | 3/1939 | Hedrick | 182/9 |
| 2,166,809 | 7/1939 | Frankel | 182/6 |
| 2,175,571 | 10/1939 | Rose et al. | 182/4 |
| 2,302,642 | 11/1942 | Deike, Jr. | |
| 2,833,454 | 5/1958 | McGee | 182/3 |
| 3,022,855 | 2/1962 | Lewis | |
| 3,957,135 | 5/1976 | Lane | |
| 3,968,858 | 7/1976 | Vollan et al. | |
| 4,130,176 | 12/1978 | Paulie | |
| 4,527,660 | 7/1985 | Andruchiw | |
| 4,582,165 | 4/1986 | Latini | 182/187 X |
| 4,802,552 | 2/1989 | Williams | 182/187 |
| 4,923,048 | 5/1990 | Cole | |
| 5,052,514 | 10/1991 | Rezmer | |

FOREIGN PATENT DOCUMENTS

| | | | |
|---|---|---|---|
| 444679 | 2/1968 | Switzerland | 182/3 |
| 484390 | 5/1938 | United Kingdom | 182/3 |
| 710340 | 9/1941 | United Kingdom | 182/9 |

*Primary Examiner*—Karen J. Chotkowski
*Attorney, Agent, or Firm*—Wigman, Cohen, Leitner & Myers

[57] ABSTRACT

A safety harness comprising a strap adapted to encircle the waist of a wearer and for coupling said strap about the waist of the wearer with a first and second lanyard connected to said strap adapted to encircle a tree. Each lanyard has an adjustable loop with a free end passed through a tubular slip collar.

8 Claims, 2 Drawing Sheets

SAFETY HARNESS FOR TREE CLIMBERS

CROSS-REFERENCE TO RELATED APPLICATION

This application is a continuation-in-part of Ser. No. 07/818,118, filed Jan. 8, 1992 and now abandoned.

BACKGROUND OF THE INVENTION

1. Field of the Invention

The present invention relates to a new and useful safety harness to prevent a tree-climber from accidentally falling out of the tree, and, more particularly, to a safety harness which allows the climber to pass over limbs without having to remove the harness.

2. Description of the Prior Art

Tree-climbing stands which allow hunters, wildlife photographers, and others to climb trees and remain perched thereupon, have become increasingly popular in recent years. For example, U.S. Pat. No. 4,969,538 to Amacker is representative of a typical tree climbing stand utilizing two climbing elements.

While most tree climbing stands are generally safe, injuries from falls frequently occur as a result of a defective climbing apparatus or carelessness on the part of the climber. To safeguard against such injuries, many climbers tether themselves to the tree trunk after they reach the desired elevation by means of a rope, chain, or the like. Unfortunately, however, most falls occur during ascent or descent. Most safety ropes are ineffective during ascent and descent because the rope or lanyard encircling the tree trunk must be removed as the climber passes over limbs. Should the climber fall while the safety rope is disengaged, this can result in serious injury to him as well as potential liability on the part of the manufacturer of the tree climbing apparatus.

SUMMARY AND OBJECTS OF THE INVENTION

In view of the foregoing limitations and shortcomings of the prior art devices, as well as other disadvantages not specifically mentioned above, it should be apparent that there still exists a need in the art for a safety harness for tree climbers which is safe and easy to use on trees having many limbs. It is, therefore, a primary object of this invention to provide a safety harness which provides protection from falls even when passing over limbs.

More particularly, it is an object of this invention to provide a safety harness having a pair of rope members for encircling the tree such that when one rope member is being repositioned above a tree limb, the other remains engaged.

It is another object of this invention to provide a safety harness which is constructed of materials which are inexpensive to manufacture and assemble.

Still another object of this invention is to provide a safety harness which is simple and practical in construction, strong and reliable in use and efficient and durable in operation.

These and other objects and advantages that will become apparent hereinafter are accomplished in accordance with the present invention by providing a safety harness comprising a strap to be worn around the waist of the wearer, and a pair of lanyards which are readily removeable from the strap adapted to encircle the trunk of the tree. In use, the climber wraps one of the lanyards around the tree trunk and ascends the tree using conventional climbing apparatus. As the climber moves up the tree, the lanyard easily slides upward until it is blocked by a limb. At that point the climber wraps the other lanyard around the tree above the limb before unhooking the first lanyard from the D-ring projecting from the strap secured to the climber's waist. In so doing he ensures that he is continuously tethered to the tree while going up or down the tree thereby eliminating the possibility of a fall.

With the foregoing and other objects, advantages and features of the invention that will become hereinafter apparent, the nature of the invention may be more clearly understood by reference to the following detailed description of the invention, the appended claims and to the several views illustrated in the attached drawings. For example, although the safety harness of the present invention is especially useful for hunters that use tree stands it also may be used for repairmen that climb utility poles.

DETAILED DESCRIPTION OF A PREFERRED EMBODIMENT

Figure 1:
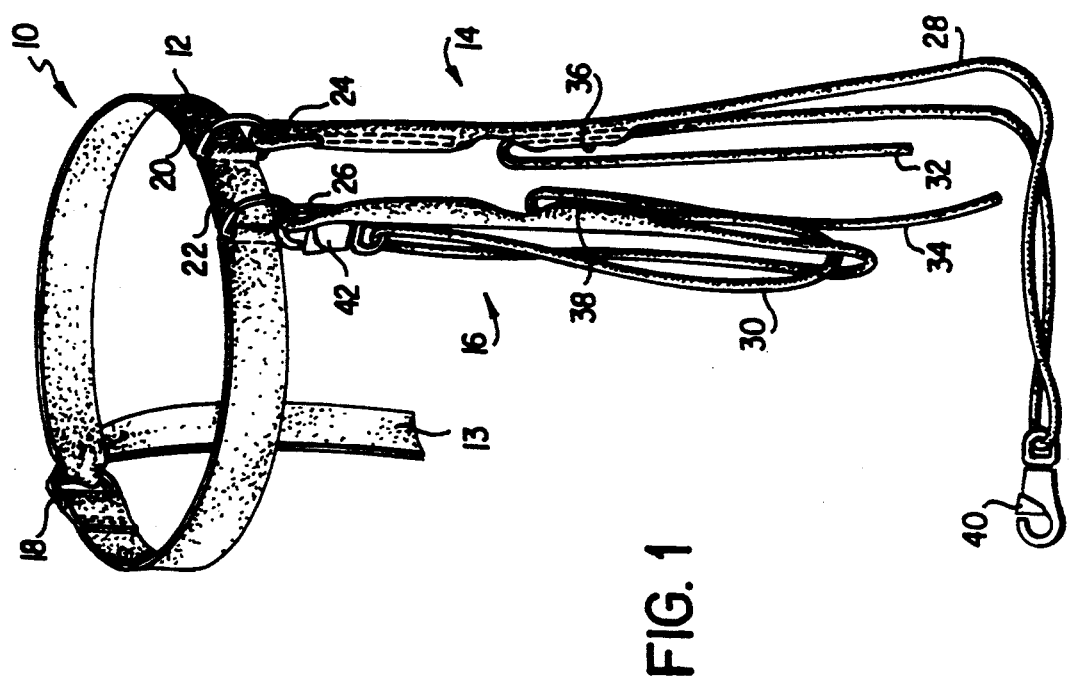
FIG. 1 is a perspective view of the safety harness of the present invention.

Referring now in detail to the drawings wherein like numerals indicate like elements throughout the several views, there is illustrated in FIG. 1 the preferred embodiment of the safety harness of the present invention designated generally by reference numeral 10. Safety harness 10 generally comprises a strap 12 to be worn around the waist of the wearer, and a pair of lanyards 14, 16 adapted to encircle the trunk of the tree.

Strap 12 is preferably constructed of a sturdy nylon woven fabric belting but may also be constructed of leather or any other suitable synthetic material. A buckle 18 is provided comprised of a pair of D rings through which the free end of strap 12 is interlaced. Alternatively, any conventional buckle which permits adjustability to varying waist sizes may be employed. A second pair of D rings 20, 22 are permanently attached to the portion of strap 12 opposite buckle 18. Attachment of these rings 20, 22 to strap 12 is best accomplished by sewing a part of the strap around the ring in a conventional manner such that the rings may pivot.

Lanyards 14, 16 may be constructed of a woven nylon rope of known construction for towing or the like. Each end of the lanyards are provided with a permanent loop 24, 26, which is received by the rings 20, 22, respectively. The opposite ends of lanyards 14, 16 form large adjustable loops 28, 30. Adjustment of loops 28, 30 is preferably accomplished by what is commonly referred to as "Indian knot" wherein the free ends 32, 34 of the lanyards are passed through a tubular slip collar 36, 38 formed at the midsection of the lanyard. With this arrangement, pulling free ends 32, 34 closes loops 28, 30 respectively thereby shortening the length of the lanyards. A pair of snap hooks 40, 42 are received by loops 28, 30 and are adapted to removably engage D rings 20, 22. Snap hooks 40, 42 are designed to be rotatable about a pivot pair P (not shown) intermediate its front and rear sections.

The "Indian knot" described herein is a braided or woven knot which itself is well-known in the art. It is also known as "chinese handcuffs" or "chinese fingercuffs". Such knot is a tubular collar which is woven or braided such that, when pulled on (in tension), the tubular collar contracts around a body or object therein and when pushed (in compression) the tubular collar expands and releases the body or object therein. Such a tubular collar structure is provided herein as an integral part of each lanyard 14, 16. The consequence of providing such an integral structure is that the free ends 32, 34 of each lanyard 14, 16 are not positively connected to any clasp or other structure. Thus, an adjustable lanyard is provided in which the free end 32, is freely moveable within the slip collar 36, 38 when the lanyard is not in tension, but is firmly held when the lanyard is placed in tension.

Figure 2:
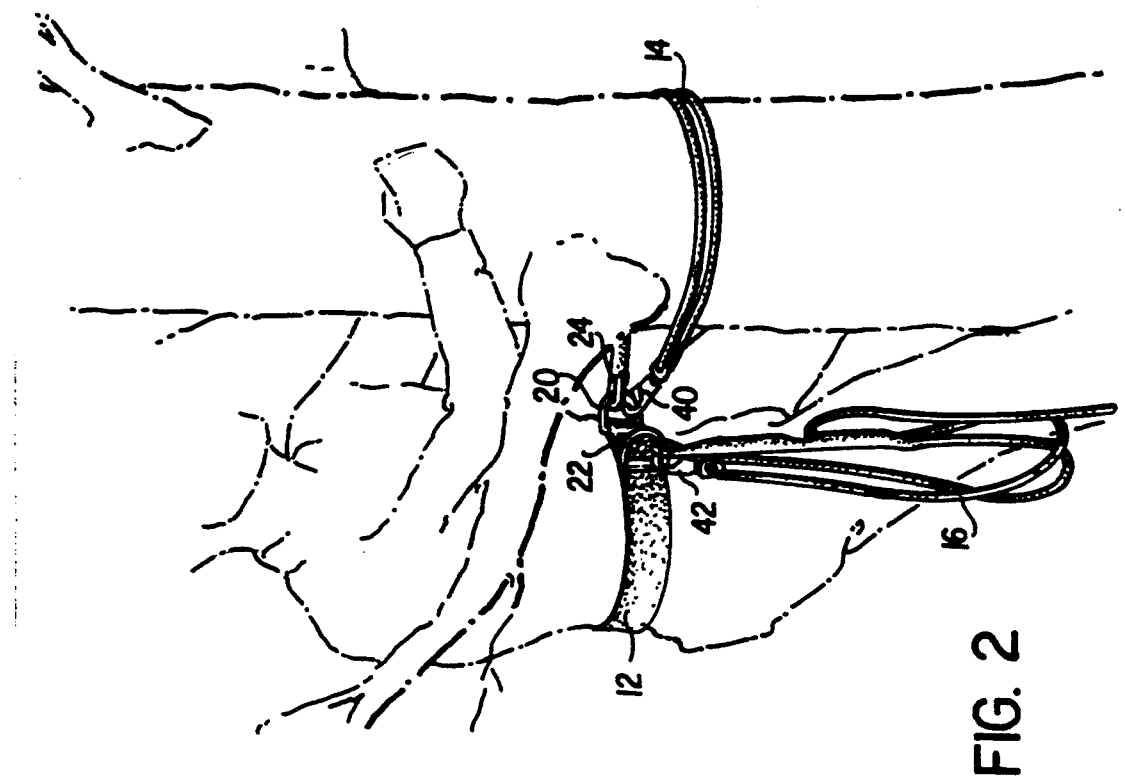
FIG. 2 is an environmental view of the safety harness of the present invention attached to a wearer climbing a tree, as the climber approaches a tree limb.
Figure 4:
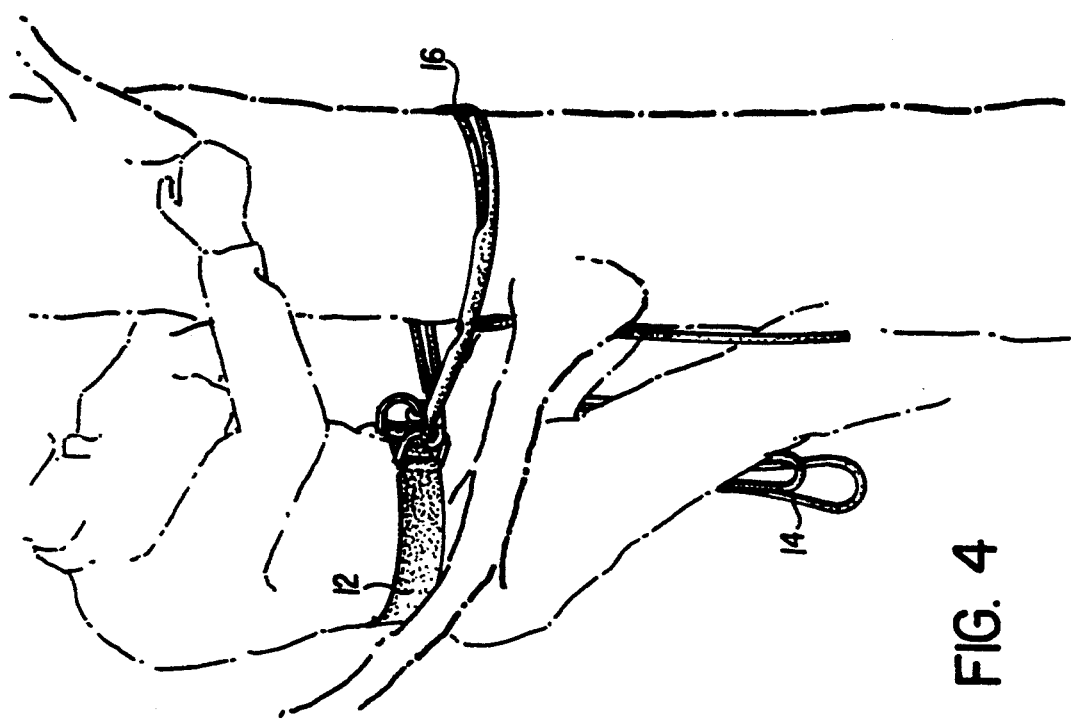
FIG. 4 is an environmental view of the safety harness of the present invention attached to a wearer after climbing over a tree limb.
Figure 3:
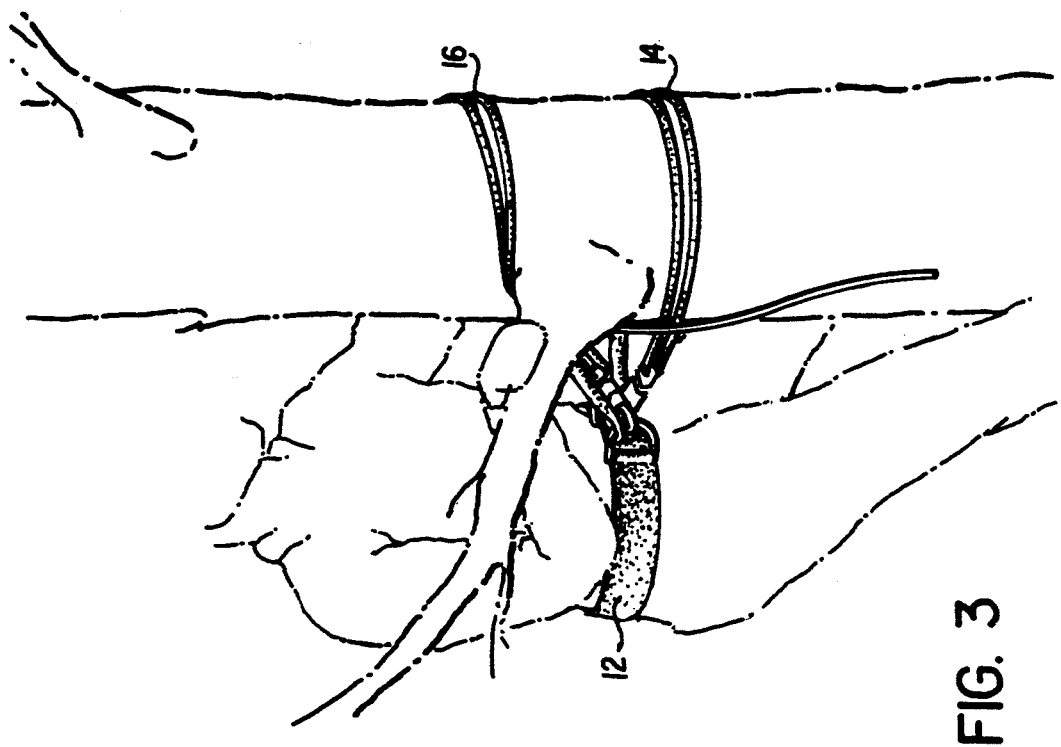
FIG. 3 is an environmental view of the safety harness of the present invention attached to a wearer climbing over a tree limb showing the positioning of one of the lanyards over the limb.

The manner of use of the safety harness 10 is illustrated in FIGS. 2, 3, and 4. Strap 12 is placed around the waist of the climber and the free end 13 is woven through D rings 18 and pulled taught. The strap is then rotated 180° such that rings 20, 22 are in front of the climber. Lanyard 14 is wrapped around the tree trunk and hook 40 is attached to D ring 20. The climber ascends the tree using one of a variety of tree climbing apparatus on the market. As he moves up the tree, the lanyard slides upward until it is blocked by a limb. At this point, the second lanyard 16 is wrapped around the tree above the limb as illustrated in FIG. 3. The first lanyard 14 is then removed (FIG. 4) so that the climber may continue up the tree. The above procedure is repeated as other limbs are subsequently encountered. Similarly, when the climber descends from the tree, the above procedure is repeated in reverse. This method provides constant protection from falls as the climber is continuously tethered from the tree even while passing over limbs.

Although only preferred embodiments are specifically illustrated and described herein, it will be appreciated that many modifications and variations of the present invention are possible in light of the above teachings and within the purview of the appended claims without departing from the spririt and intended scope of the invention.

What is claimed is:

1. A safety harness comprising:
   a strap adapted to encircle the waist of a wearer;
   means for coupling said strap about the waist of the wearer; and
   a first and a second lanyard connected to said strap, each said lanyard adapted to encircle a tree, each said lanyard independently connectable to and disconnectable from said strap at independent positions on said strap located substantially adjacent each other and at the front of the wearer, and each said lanyard having an adjustable loop for encircling the tree, said loop formed by a free end passed through an Indian knot in the form of a tubular slip collar integrally formed with said lanyard at a midsection of said lanyard, said free end to be engaged by said slip collar when said lanyard is placed in tension.

2. The safety harness according to claim 1, wherein said coupling means comprises a pair of D rings mounted to one end of said strap wherein the opposite end of said strap is interlaced through said D rings to secure the strap around the waist of the wearer.

3. The safety harness according to claim 1, wherein each of said first and second lanyards comprises a first end anchored to said strap and a second end opposite said first end having a hook mounted thereto, said hook being removably attachable to a means for connecting said lanyard to said strap.

4. The safety harness according to claim 3, wherein each of said connecting means comprises a D ring pivotably affixed to said strap.

5. The safety harness according to claim 2, wherein each of said first and second lanyards comprises a first end anchored to said strap and a second end opposite said first end having a hook mounted thereto, said hook being removably attachable to a means for connecting said lanyard to said strap.

6. The safety harness according to claim 5, wherein each of said connecting means comprises a D ring pivotably affixed to said strap.

7. The safety harness according to claim 3, wherein said hook is rotatable with respect to the lanyard to which it is attached.

8. A method of climbing a tree having at least one limb, comprising the steps of:
   placing a safety harness around the waist of a climber, said safety harness comprising:
   a strap adapted to encircle the waist of a wearer;
   means for coupling said strap about the waist of the wearer; and
   a first and second lanyard connected to said strap, each said lanyard adapted to encircle the tree, each said lanyard independently connectable to and disconnectable from said strap at independent positions on said strap located substantially adjacent each other and at the front of the wearer, and each said lanyard having an adjustable loop for encircling the tree, said loop formed by a free end passed through an Indian knot in the form of a tubular slip collar integrally formed with said lanyard at a midsection of said lanyard, said free end to be engaged by said slip collar when said lanyard is placed in tension;
   encircling said tree with said first lanyard;
   climbing said tree until said first lanyard is blocked by the limb;
   encircling the tree with said second lanyard above the limb, independently of said first lanyard;
   adjusting said adjustable loop in each said lanyard by pulling on said free end to shorten said loop and pulling on said lanyard to lengthen said loop, and engaging said free end by said slip collar by placing said lanyard in tension;
   removing said first lanyard from the tree; and continuing to climb the tree.

* * * * *